Jan. 17, 1961 E. N. JONES 2,968,351
FLUID PRESSURE OPERATED CHEMICAL FEEDER
Filed Aug. 7, 1956 5 Sheets-Sheet 1

Edward N. Jones
INVENTOR.

BY

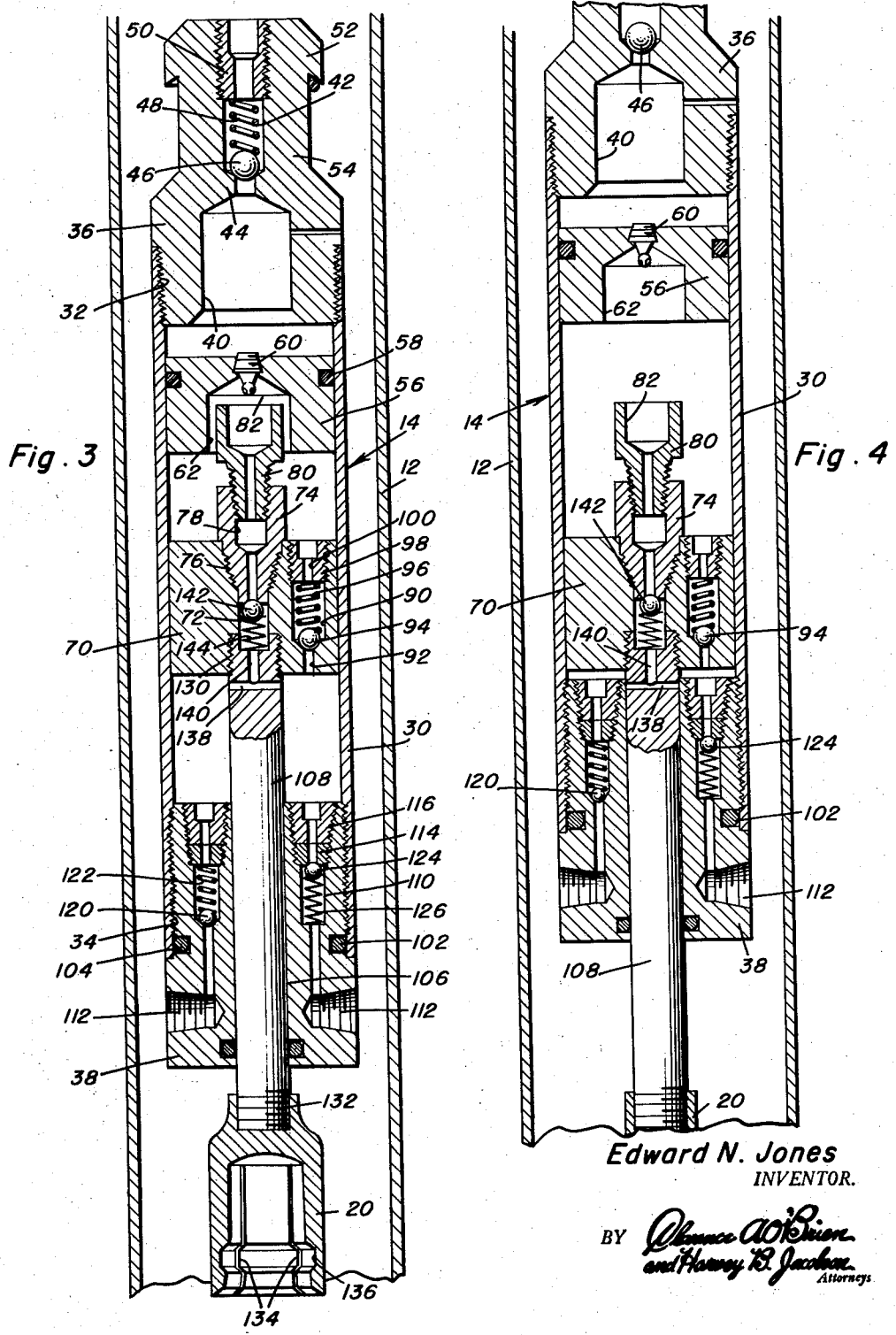

Jan. 17, 1961 E. N. JONES 2,968,351
FLUID PRESSURE OPERATED CHEMICAL FEEDER
Filed Aug. 7, 1956 5 Sheets-Sheet 3
Fig. 5
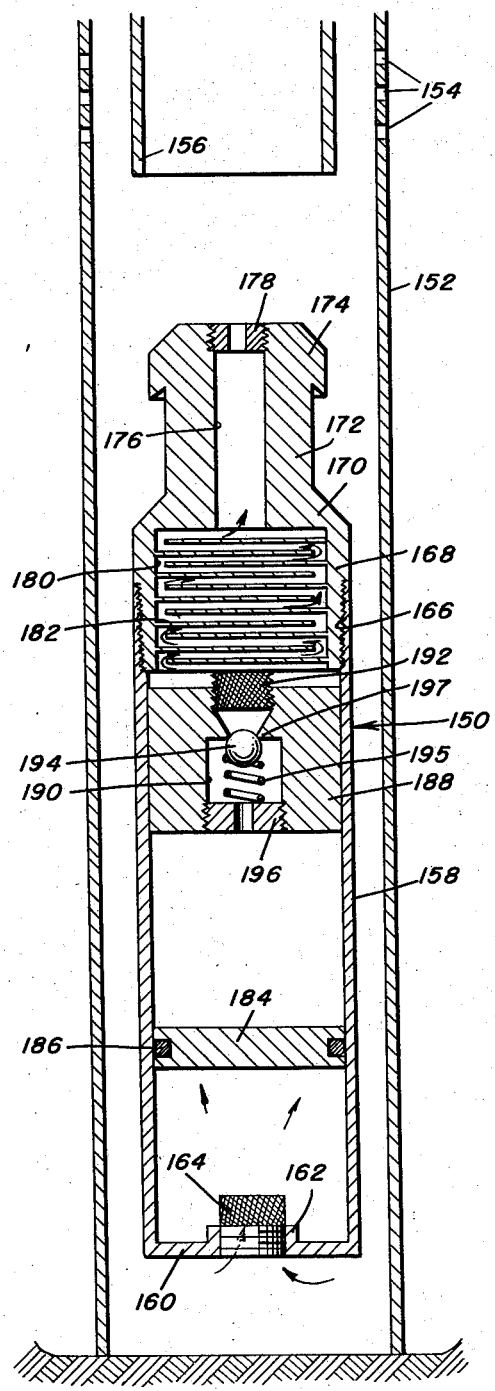
Fig. 13
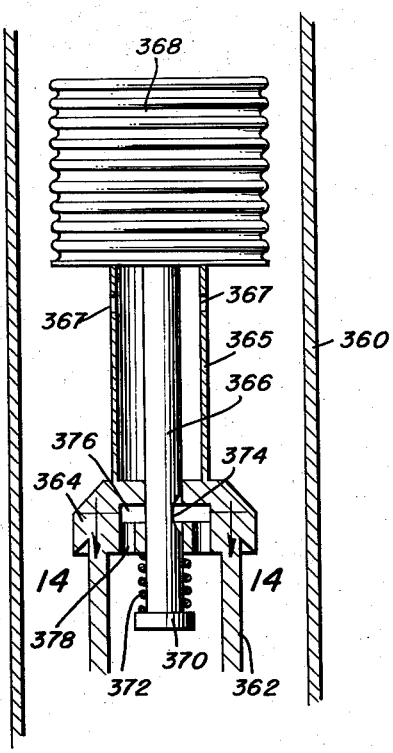
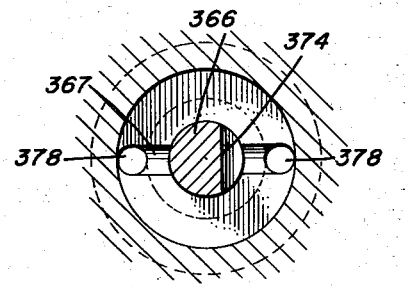
Fig. 14
Edward N. Jones
INVENTOR.
BY
Attorneys Jan. 17, 1961 E. N. JONES 2,968,351
FLUID PRESSURE OPERATED CHEMICAL FEEDER
Filed Aug. 7, 1956 5 Sheets-Sheet 4
Fig. 6
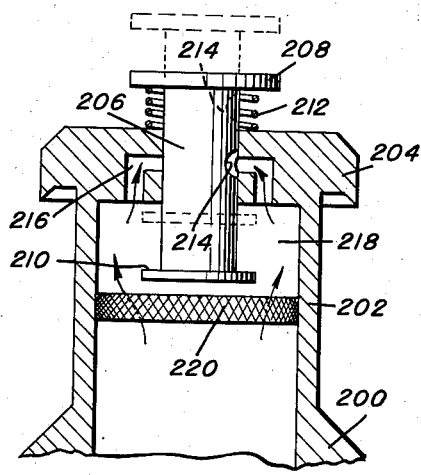
Fig. 7
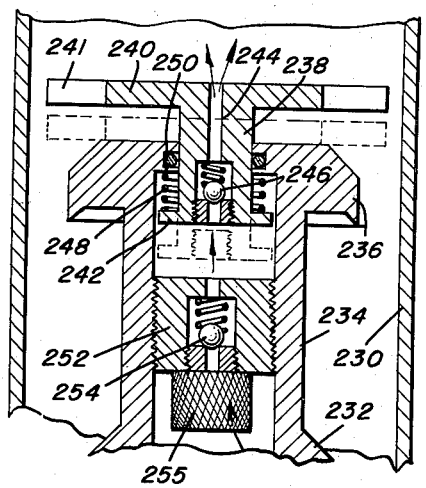
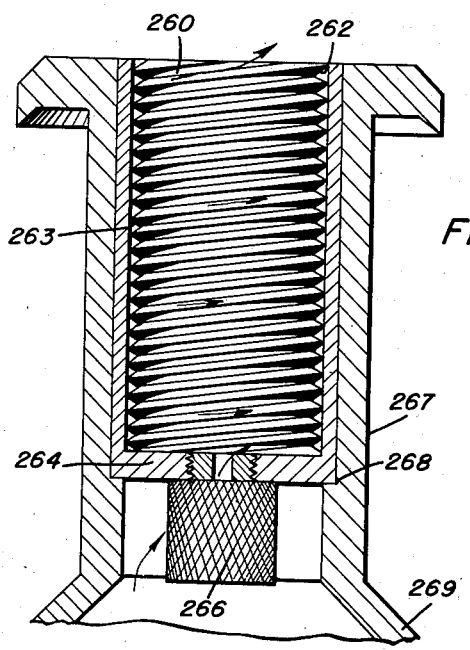
Fig. 8
Fig. 9
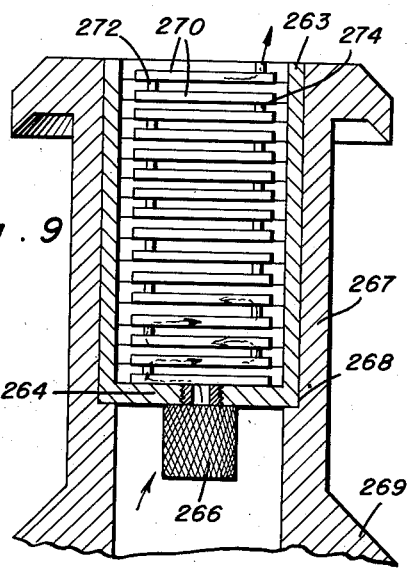
Edward N. Jones
INVENTOR.
BY
Attorneys Jan. 17, 1961 E. N. JONES 2,968,351
FLUID PRESSURE OPERATED CHEMICAL FEEDER
Filed Aug. 7, 1956

Edward N. Jones
INVENTOR.

BY *Clarence A. O'Brien*
and *Harvey B. Jacobson*
Attorneys

United States Patent Office 2,968,351
Patented Jan. 17, 1961

2,968,351

FLUID PRESSURE OPERATED CHEMICAL FEEDER

Edward N. Jones, P.O. Box 107, Pettus, Tex.

Filed Aug. 7, 1956, Ser. No. 602,621

11 Claims. (Cl. 166—162)

This invention comprises a novel and useful fluid pressure operated chemical feeder and more particularly relates to a means for controllably depositing chemicals in a flowing well.

The primary purpose of this invention is to provide a means for depositing chemicals in a flowing well and especially at the deepest accessible spot therein.

An important object of the invention is to provide a means whereby chemicals for treating a well for various purposes may be introduced into a well and may be released for treating the well under the complete control of the operator.

A further object of the invention is to provide an apparatus in accordance with the foregoing objects whereby the well treating chemicals may be introduced into a well through the tubing, casing and flow line thereof and with a minimum of delay and labor.

A further important object of the invention is to provide an apparatus in accordance with the above mentioned objects whereby chemicals may be released in successive batches for treating a well at any selected time and whereby the chemicals may be controllably released from the surface of the well without the necessity for the provision of a release control means communicating with the chemical container and the surface.

Yet another object of the invention is to provide an apparatus whereby controlled variations produced in the flow velocity or pressure in a well may be employed for thereby selectively and repeatedly releasing chemicals for treating a well.

A still further very important object of the invention is to provide an apparatus in accordance with the above set forth objects whereby the shutting in and opening of a flowing well may be utilized to produce a pressure difference within the well which shall be effective for releasing measured charges of chemicals into the well for treating the same.

An additional object of the invention is to provide an apparatus for introducing a treating chemical into the bore of a producing well, and which may be readily introduced into and removed through the flow tubing of the well by a wire line; or may be introduced by dropping into the flow tubing; and which may, when introduced, be positioned and securely held at a predetermined position in the well bore.

Still another object of the invention resides in the provision of an apparatus for depositing a quantity of a chemical treating agent in the bore of a producing well at a desired location therein and releasing the agent into the flow of the well either by successive batches at controlled intervals or continuously and at a rate corresponding to the rate of flow of the well.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a view in vertical section, parts being broken away, showing a well bore and the manner in which one embodiment of an apparatus according to this invention may be introduced thereinto for releasing chemicals for treating the well, there being shown in full line the manner in which the chemical containing and releasing receptacle is introduced into or removed from a well bore, and in dotted lines whereby the chemical containing and releasing receptacle may be anchored and left in a selected position in a well bore;

Figure 3 is an enlarged vertical sectional view, taken substantially upon the plane indicated by the section line 3—3 of Figure 1 and showing the internal construction of the receptacle for releasing charges of a chemical into a well, the parts being shown in their inactive position in preparation for the chemical dispensing operation;

Figure 4 is a view similar to Figure 3 but showing the position of the parts upon the completion of a chemical dispensing operation of the apparatus;

Figure 5 is a view similar to Figure 4 but showing a modified form of apparatus which is gravity operated to continuously discharge a chemical treating agent in accordance with the principles of this invention;

Figure 6 is a view in vertical section of the upper portion of a still further modified embodiment of apparatus;

Figure 7 is a view similar to Figure 6 of yet another form of apparatus;

Figure 8 is a view in vertical section of still another form of gravity actuated apparatus;

Figure 9 is a view in vertical section of yet another form of gravity actuated apparatus;

Figure 13 is a view in vertical central section of a still further form of apparatus; and Figure 14 is a horizontal sectional view taken substantially upon the plane indicated by the section line 14—14 of Figure 13.

Figure 1:
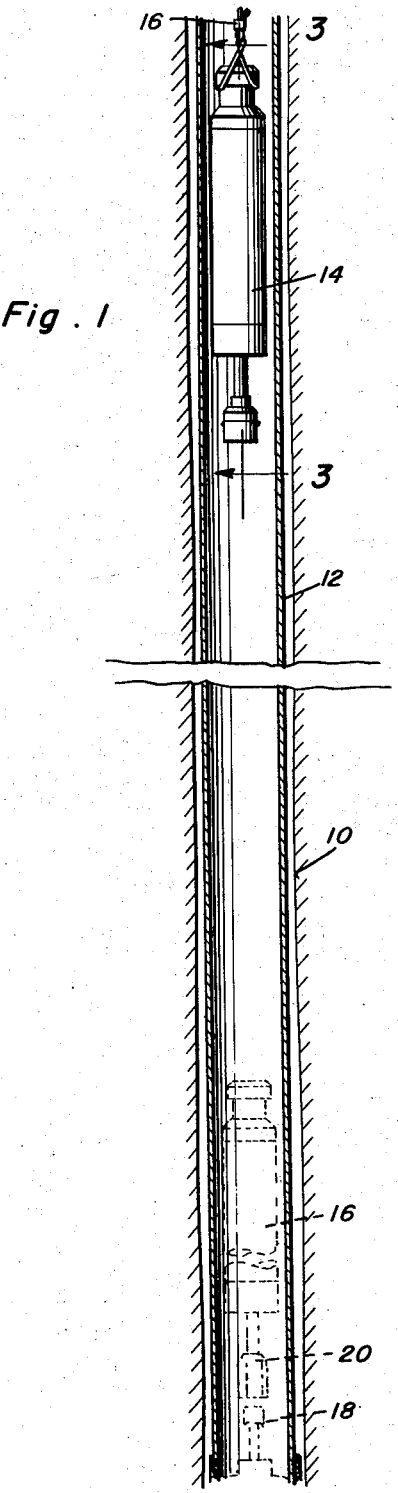

The fundamental purpose of this invention is to provide an apparatus whereby a well treating chemical of any desired character and for any desired purpose may be easily, conveniently and with certainty introduced into the bore of a well, and particularly of a flowing well, with a minimum interruption of the flow or operation of the well, and at a desired location thereat; and whereby in a simplified manner, without the necessity for an actuating means connecting the chemical containing receptacle with the surface of the ground, successive charges of the chemical may be ejected from the apparatus into the well for treating the same.

Briefly, the preferred method by which these objects are attained consists in introducing a receptacle containing the chemical treating agent into the well in any desired manner to a predetermined location therein; causing a variation in the pressure prevailing in the well bore as by selectively shutting in or opening the flow of the well; utilizing the pressure fluctuation produced by the selective shutting in or flowing of the well to effect a timed release of the charge of the chemical from the receptacle into the well.

The method as practiced by this invention possesses the distinct advantages of easy introduction of a receptacle containing a chemical treating agent into a well bore at a predetermined location, as by either dropping the receptacle through the tubing or lowering the same upon a wire line to the desired position and thereafter releasing the receptacle from the wire line and withdrawing the latter, whereby to leave the receptacle securely positioned at the desired location as by anchoring the same upon a suitable tubing anchor and after the receptacle has been exhausted of its contents, subsequently removing the receptacle by a wire line. This enables the receptacle to be introduced as through the flow tubing of a well; and when once the receptacle is in place, the well may be caused to flow as desired. This flow may be momentarily interrupted each time it is desired to effect a discharge of the chemical from the receptacle, and may thereupon be resumed.

A further important feature of the invention consists in providing a receptacle which serves as a combined container for the treating agent, as a pumping or dispensing means for discharging the chemical from the receptacle into the well; as a metering device for effecting a measured charge of chemical for dispensing into the well; and as an actuating mechanism for ejecting the chemical into the prevailing pressure in the well.

Embodiment of figures 1-4

In the embodiment of apparatus for carrying out the method in accordance with Figures 1–4, the numeral 10 designates a well bore extending from the surface of the ground into a petroliferous oil or gas bearing formation. Shown at 12 is a section of a tubing or casing disposed in the bore 10 and by means of which the gas or oil from the formation flows to the surface, usually under the residual pressure of the formation.

It is understood that the producing well will have any suitable flow controlling means at the surface, but since the construction of such flow control means does not in itself form any part of this invention, and is unnecessary to an understanding of the method and apparatus set forth hereinafter, an illustration and description of the same is deemed to be unnecessary and has been omitted from the drawings and description.

Indicated generally by the numeral 14 is a receptacle containing any desired chemical treating agent for application to the well bore, or to the interior of the casing or tubing 12, or to the gas or oil flowing through the same. A conventional form of wire line is indicated at 16 by means of which the receptacle 14 may be lowered to any desired location in the well bore as shown in full lines in Figure 1, or may be positioned and then released as shown in dotted lines in Figure 1, with the wire line being then withdrawn until it is desired to retract the empty receptacle.

Shown in dotted lines at the bottom of Figure 1 is a conventional form of tubing anchor or collar stop 18 which is appropriately positioned in the casing or tubing 12, and which is adapted to receive and support a coupling member 20, see also Figure 3, carried by the lower end of the receptacle 14 for anchoring the same at the desired location within the tubing 12.

In general, this form of securing means is employed for maintaining any of the various embodiments illustrated and described hereinafter, in a predetermined position in the tubing or casing of a flowing well.

Figure 2:
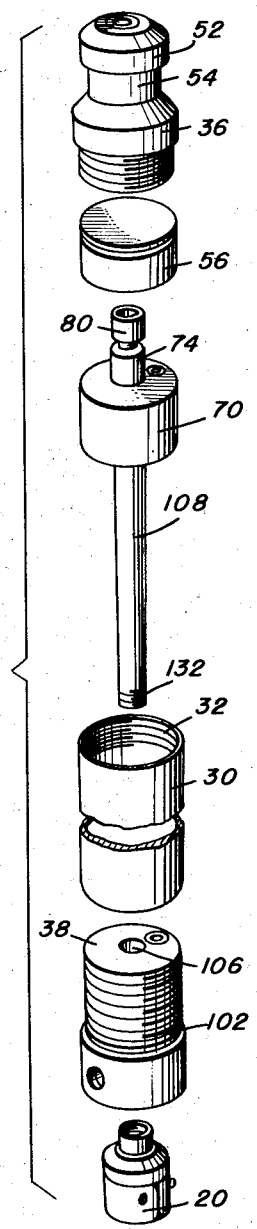
Figure 2 is an exploded perspective view of the form of chemical container shown in Figure 1, a part of the container being broken away.

Referring now especially to Figures 2 and 3 it will be seen that the receptacle 14 consists of a cylindrical barrel or casing 30 which is internally threaded as at 32 and 34 at its upper and lower ends respectively for receiving externally threaded upper and lower closure members 36 and 38 respectively.

The upper closure member 36 is provided with a central recess 40 opening upwardly from its lower end, and is provided with an axial passage 42 therethrough opening from its upper end into the recess 40, this passage having a diametrically reduced portion 44 to constitute a seat for a downwardly closing ball valve 46 which is urged against its seat as by a compression spring 48 retained by a nipple 50 disposed in the upper end of this passage. An enlarged head 52 is provided upon the reduced neck portion 54 of the upper closure member and constitutes a means whereby the wire line 16 may be releasably secured to the upper closure member for thereby raising and lowering the receptacle.

Freely slidable in the barrel 30 and immediately beneath the upper closure member 36 is a piston 56 having a packing or sealing ring 58. The piston is provided with an axial bore therethrough, the upper end of this bore having a conventional form of valved fitting 60, such as the well known "Zerk" fitting, this fitting opening into a diametrically enlarged axial chamber 62 in the lower portion of the piston for venting any gas accumulating in the chamber 62.

Immediately below the floating piston 56 in the barrel 30 is an ejecting piston 70 having an axial passage 72 therethrough, the passage having its upper and lower ends diametrically enlarged and internally threaded. A nipple 74 has its lower extremity tapered and externally threaded as at 76 for reception in the upper end of the passage 72, and the nipple in turn is provided with a diametrically enlarged bore 78 in its upper end which is also internally threaded for the reception of the externally threaded lower extremity of a further nipple 80. The latter has its upper end diametrically enlarged and provided with an axially disposed recess or chamber 82 which is movable into close proximity to the fitting 60 as shown in Figure 3, with the upper end of the nipple 80 being disposed in the chamber 62 in the free floating piston 56; or may be moved remote therefrom when the injecting piston 70 is moved downwardly as shown in Figure 4, upon its chemical injecting stroke.

The piston 70 is provided with one or more longitudinally extending passages 90 therethrough, these passages having each an inlet port 92 at the lower face of the piston 70, which port is controlled by a downwardly closing ball valve 94, spring urged to closing position as by a compression spring 96 disposed in the passage 90, there being further provided a centrally apertured nipple 98 at the upper end of the passage serving to retain the spring and providing a discharge port 100. The flow of fluid is upwardly through the passages 90.

Attention is now directed to the lower closure member 38. This member is provided with an annular groove 102 for receiving a packing ring 104 of any desired construction by which a fluid tight seal is established with the lower end of the receptacle casing 30. There is provided an axial bore or passage 106 from the top to the bottom side of the body 38 for slidably receiving a rod 108 therethrough. There are also provided a plurality of longitudinally disposed passages 110 in the body 38, these passages at their lower end opening into laterally extending internally threaded bores 112 and at their upper ends being provided with externally threaded nipples 114 and 116.

As will be observed from Figures 3 and 4, one passage or one set of passages 110 is provided with a valve seat having a downwardly closing check valve 120 which is urged against its seat as by a compression spring 122 whose other end bears against the nipple 114. The other passage or set of passages is provided with a similar ball check valve 124 which is yieldingly urged by the compression spring 126 against a valve seat in the nipple 114.

It will thus be observed that one set of passages will permit flow upwardly through the lower closure member, while the other passage will permit flow only downwardly through the same.

Referring again to the rod 108, it will be seen that the upper and lower ends of the same are externally threaded as at 130 and 132 for engagement in the internally threaded lower end of the passage 72 through the injecting piston 70, and for engagement in an internally threaded recess at the upper end of the coupling member 20. The latter, as shown in Figure 3, may consist of a downwardly opening sleeve which is suitably longitudinally slotted as at 134 to impart radial resiliency to the sleeve, there being provided an internal annular circumferentially extending groove 136 which is adapted to yieldingly snap over the correspondingly shaped head upon the tubing anchor 18.

It will be further observed that the upper portion of the rod 108 below the bottom surface of the injecting piston 70 is provided with a transverse bore 138 which is intersected by an axial bore 140 opening into the passage 72. The lower end of the nipple 74 constitutes a valve seat which is engaged by a ball check valve 142, this valve being yieldingly urged upwardly into seat closing position as by a compression spring 144.

The operation of the apparatus is as follows. When the device is supported upon a collar support 18 by the coupling member 20, as suggested in dotted lines in Figure 1, the piston 70 and rod 108 will be held stationary and the barrel 30 will move downward under gravity when the flow is stopped by shutting in the well at the surface, this being the condition shown in Figure 3; and will move upward under the velocity and force of the flowing fluid in the tubing or casing 12 when flow is resumed and the well is again opened, this being the condition shown in Figure 4.

The relative reciprocation of the barrel 30 and the pump and piston unit 70, 108 will effect intake and delivery strokes of the injecting pump chamber lying between the piston 70 and the end plug 38; and will transfer charges from the storage chamber lying between the pistons 56 and 70 to the injecting pump chamber below the piston 70 through the passage means 80, 74, 72, 140 and 138.

In the arrangement of Figures 3 and 4, it will be assumed that the device is supported upon a collar stop 18 by its coupling 20. When the well is shut in at the surface, and the flow stops, the barrel 30, being no longer urged upwardly and supported by the velocity and force of the flowing fluids, will drop by gravity to the lowermost position as shown in Figure 3. The resultant relative upward travel of the injecting piston will expand the injection chamber lying beneath and will contract the storage chamber lying above the piston 70, this being the position of Figure 3. As the piston moves up, the check valve 94 is closed and a charge of the chemical in the storage chamber above the piston 70, the amount being proportional to and controlled by the length of the piston stroke, is forced through the passages in 80, 74 through the check valve 142 and passages 140, 138 into the expanding injection chamber below the piston. Thus, a controlled and measured charge of the chemical is taken into the injection chamber in readiness for ejection from the device.

When the flow of the well is restored by opening the same, the restoration of the velocity and force of flow will again lift the barrel 30 upwardly, thereby moving the piston 70 downwardly. This compresses the measured charge of chemical previously introduced into the injection chamber and ejects it through the valve 124 and passages 110, 112 into the stream of fluid flowing in the tubing.

It will be apparent that this operation will be repeated each time the well is shut in and again allowed to flow, until the quantity of chemical agent stored in the device has been exhausted.

By this apparatus and method it is therefore possible to effect repeated injections of chemicals into a well bore at a predetermined location therein; and to achieve this in a simple manner from the surface and solely by manipulating the conventional flow control valve of a well, thereby eliminating the inconveniences of mechanical connections from the surface to the dispensing receptacle and reducing to a few moments the time during which the flow of a well is interrupted.

Obviously the quantity of chemical injected at each stroke of the piston can be readily varied by controlling the piston stroke in any desired manner, as by applying spacing washers to the rod 108 on either side of the member 38 or by the use of adjustable or variable stops of any desired chamber or by adjusting the length of the rod 108.

The Zerk fitting 60 provides a non-return valved outlet or vent for discharging any gas accumulation in the chamber 62 upwardly, from whence it may escape past the valve 46.

The valve 46 acts as a pressure relief valve, venting pressure in the chamber above the floating piston 56 to the exterior of the device when the internal pressure exceeds that upon the exterior. The valve 46 releases fluid trapped above the piston 56; releases any pressure which may be trapped between 56 and 36 when the device is removed from a region of high pressure to one of lower pressure; and releases any fluids that would be trapped between 56 and 36 when the chamber between pistons 56 and 70 is loaded with the chemical treating agent.

The valve 46 also functions to lessen or prevent contamination of the compound by the entry of well fluids through the passage 42 while functioning as a pressure relief valve. Since valve 46 does not have an air-tight fit in 44, no vacuum is formed. The nipple 50, which may contain a filter will prevent sand and foreign particles from entering the vacant chamber established above 56 when the latter moves downwardly, as set forth hereinafter.

The valve 120 is employed solely for charging the device with the compound to be dispensed thereto. The operation of charging is as follows.

The port 112 associated with valve 124 is closed. The material with which the device is to be charged is now supplied under pressure to the port 112 associated with the valve 120, entering and filling the chamber below piston 70, lifting the latter and the rod 108 until engagement of the member 20 with 38 prevents further movement. Continued injection of the chemical agent now passes valve 94, filling the chamber above the piston 70 and lifting the floating piston 56 until it engages 36. As above mentioned, fluids above piston 56 are vented by the valve 46. The receptacle is now fully charged. The closure plug not shown for the port 112 of the valve 124 is now transferred to the port 112 of the valve 120, mainly as a precaution and in order to have the plug available for the next charging operation. The device is now ready for operation.

The well flow is halted and the device is now positioned in a well bore and secured to the anchor 18 as previously mentioned, the rod 108 and piston 70 being held stationary. Upon resumption of flow of the well, the force applied to the body 30 by the velocity of flow slowly moves the body 30 upwardly, compressing the charge of agent in the injection chamber between 70 and 38 and ejecting it in a relatively slow and continuous operation through the valve 124 and associated port 112. The ejection continues until the member 38 engages the member 70, all of the charge in the injection chamber having been discharged and the passage 138 being automatically closed by the member 38, as shown in Figure 4, thereby preventing any leakage from the chamber above the piston 70 therethrough.

When desired, the well is again shut in, and the body 30 again descended by gravity to the position of Figure 3. During this descent, a new charge is delivered into the expanding injection chamber below the piston 30 from the storage chamber above the latter, through the passages 82, 78, 72, 140 and 138, the pressure produced in the storage chamber by the relative upward travel of the piston 70 therein effecting this flow. When 38 abuts the member 20, the transferring operation of the compound from the storage chamber to the injection chamber is completed. As the quantity of compound above the piston 70 is depleted, the floating piston 56 moves downward.

The floating piston 56 serves to reduce contamination of the chemical treating agent and serves to increase the pressure on the latter. Since the specific gravity of the compound is less than that of most fluids, contamination by osmotic action is prevented by this separation.

Embodiment of Figure 5

Figure 5 shows a gravity operated, second embodiment of apparatus indicated generally by the numeral 150 and which may conveniently be dropped or lowered by wire line into the bottom of a well after the rods and pump are removed. There is shown a well casing 152 having a perforated section 154 opening into a producing formation and by means of which the gas and oil produced passes into the casing. Shown at 156 is the bottom portion of a string of tubing by which the well is produced, and through which after the pump and pump rods are removed, the device 150 is dropped or lowered to the bottom of the well bore.

In this form of apparatus the receptacle comprises a cylindrical barrel or casing 158 having a closed bottom wall 160 having an upwardly directed tubular boss 162 therein provided with a nipple 164, constituting a suitable sand filter. The upper end of the casing is internally threaded as at 166 to receive the externally threaded lower portion 168 of the upper closure member 170 having a diametrically reduced neck portion 172 with an enlarged head 174 at its upper end. The head provides a means whereby a wire line, grapple or other retrieving means may be engaged upon the device for lowering the same into the well bore and for lifting the same through the tubing 156 to remove the device from the well bore.

The upper closure member 170 is provided with an axial passage 176 extending therethrough and an externally threaded bushing 178 is received in this passage to provide a chemical discharge orifice. In the lower portion of the upper closure member 170 there is provided a diametrically enlarged chamber 180 in which is provided a series of interdigitated baffles 182 providing a tortuous passage through the chamber as shown by the arrows.

Floating in the same portion of the barrel 158 is a free floating piston 184 having a packing means 186 thereon, while a stationary piston 188 having suitable sealing means, not shown, is fixedly received in the barrel 158 above the piston 184. The stationary piston has a central passage 190 opening upwardly through its lower end and communicating with the space above the piston as by means of a nipple constituting a filter 192. An upwardly closing check valve 194 cooperates with the valve seat formed in the end of the nipple or in the bottom wall of the passage 190, the valve being urged against the seat as by a compression spring 195 which is retained by the externally threaded bushing 196. A groove 197 provides a restricted leak past the valve seat.

The storage chamber for the chemical treating agent, lying between the members 184 and 188 is preferably filled with an oil base compound, having for example a specific gravity of about .8 or .9 or one lower than that of the well fluids. The chamber below piston 184 is exposed to and hence filled with the fluid in the well bore through the member 164. The piston 184 operates to prevent comingling of the well fluid from the member 164 with the treating agent. When this form of the device is charged and ready for use, the floating piston 184 will be positioned adjacent 164.

Due to the difference is specific gravities the well fluid will tend to enter through the passages 178, 176, 180, 190, 196 into the chamber above piston 184, gradually filling this chamber and slowly displacing the treating agent which will be ejected through 180, 182, 176 and 178. During this operation the pressure difference of the flowing well fluids acting at 176 and 164 will gradually move the piston 184 upwardly further assisting in discharging the chemical agent.

Obviously the throttling effect of the choke plates 182 as well as the viscosity of the compound and its specific gravity will control the rate of its continuous feeding into the well fluids. The spacing of the plates 182 will be selected in accordance with the viscosity and desired rate of flow of the treating chemical, while interchangeable metering orifices 178 may be provided.

It will thus be seen that by this embodiment the treating chemical can be released directly into the well casing below the productive zone and into any oil collected therebelow.

Embodiment of Figure 6

The embodiment of Figure 6 shows a still further modified construction wherein a receptable 200 has a diametrically reduced upper neck 202 provided with an enlarged head 204. Slidable through this head is a plunger 206 constituting a metering valve and dispenser, and which is headed at its outer and inner ends as at 208 and 210 respectively. A compression spring 212 is provided encircling the plunger and abutting against the head 208 and the top of the portion 204 to yieldingly urge the plunger outwardly into position for dispensing a measured charge of the chemical as shown in dotted lines. The surface of the plunger is provided with a longitudinally extending recess or groove 214 which as shown by the full and dotted lines in Figure 6 is adapted to selectively register with a plurality of passages 216 provided in the head portion 204 and communicating with the interior of the barrel 202, and with the exterior of the receptacle. When the plunger is depressed, as shown in full lines, the recess 214 registers with these passages 216 for charging the recess with a measured charge of the chemical which is received in a dispensing chamber 218. However, when the plunger moves outwardly to the dotted line position, under the influence of the spring 212, the dispensing passage 214 moves to the dotted line position lying above or exterior of the head portion 204, thereby delivering the measured charge of chemical from the receptacle into the well bore.

A filter 220 is provided in the interior of the receptacle 200, and the lower end of the receptacle may be of the same construction as that shown in Figure 5. In operation, the pressure pulsations of fluid in the well, whether produced artificially as by opening and closing the well, by operation of the conventional well pump or by other means, will cause reciprocation of the plunger 206 to pump and discharge successive measured charges of chemical into the well.

Embodiment of Figure 7

In the form of apparatus shown in Figure 7 a flow tubing is indicated at 230, in which is mounted as by a tubing collar stop a dispensing receptacle 232. This receptacle includes a diametrically reduced neck portion 234 having an enlarged head 236 in which is mounted a dispensing pump. The latter comprises a plunger 238 slidably received in this head, the plunger having enlarged upper and lowr ends 240 and 242 respectively, the former comprising an actuating head for the plunger. A passage 244 extends through the plunger and a downwardly closing ball valve assembly 246 controls this passage. A compression spring 248 disposed between the enlarged portion 242 and a shoulder in the headed portion 236 surrounds the plunger and yieldingly urges the latter to its inward position shown in dotted lines in Figure 7. A convenient packing means as at 250 may be provided to establish a fluid tight seal between the plunger and the bore in which it is reciprocably received.

An externally threaded sleeve or bushing 252 is disposed in the neck portion 234, and is provided with a downwardly closing ball check valve 254. Indicated at 255 is a filter assembly similar to that shown at 164 in Figure 5. Peripheral extensions 241, which may be of a flexible nature, project from the upper end 240 beyond the head 236 into proximity to the casing or tubing 230.

In operation, the receptacle is mounted in such manner that the enlarged head 240 and its extensions 241 will be exposed to and be reciprocated by variations in the velocity of flow of the fluids flowing through the well tubing 230 for ejecting charges of chemical from the storage chamber in the receptacle below the member 252 with the injector chamber above the latter and from thence, by the valve passage 244 into the tubing.

The amount of fluid injected at each stroke can be adjustably varied by adjusting the stroke of the plunger 238, or by the size of the various orifices or passages or by the type of filter 255 employed. The sensitivity of the device to pressure or flow velocity variations can also be controlled through the tension of the springs 248 and for those of the check valves 246 and 254.

Embodiment of Figure 8

In the preceding embodiments of Figures 1–4, 6, and 7, the injection of the chemical from the receptacle into the well was effected by a positive displacement type of pump. It is also possible, however, to effect the injection by constructions having no moving parts, such as by gravity as in Figure 5. The embodiments of Figures 8 and 9 illustrate suitable manners for carrying out this principle or phase of the invention. In the embodiment of Figure 8 there is provided a generally cylindrical member 260 having upon its external surface a helical groove or channel 262. The length and size of this channel is such as to provide a relatively long passage having a predetermined resistance to flow therethrough. The member 260 is pressed into a sleeve 263 having a bottom wall 264, with a threaded aperture receiving a filter unit 266. The sleeve may be press fitted into the open neck portion 267 and seated upon the shoulder 268 of a receptacle 269 which may be of the construction of the receptacle 150 of Figure 5.

As in Figure 5, the greater weight or specific gravity of the well fluids will enter the tortuous passage provided by the screw threads 262 between the members 260 and 263, displacing the treating agent therefrom by this gravity head and effecting a slow continuous ejection of the treating agent into the fluids in the well bore.

Obviously the length and resistance to flow of the groove 262 may be selected to effect a desired control on the quantity of chemical injected. The controlled fluctuations of the pressure and/or velocity of flow in the well bore will control the time of ejection of the chemicals.

Embodiment of Figure 9

The arrangement of Figure 9 is somewhat similar to that of Figure 8. In this form the same construction of sleeve 263, bottom wall 264 and filter unit 266 are associated with the neck 267 and seat 268 of the receptacle 269, as in the preceding embodiment. However, there are provided, in place of the body 260, a series of vertically spaced chambers 270 formed by weir plates and which communicate with each other by oppositely disposed ducts or passages 272 and 274. There is thus provided a tortuous passage by which the chemical in the container is discharged into the well bore by virtue of the gravity head resulting from the difference in specific gravity of the well fluids and the lighter chemical treating agent.

In this embodiment, the control of the quantity of the chemical ejected may be effected by varying the spacing between and the number of the weir plates forming the chambers 270, the spacing and size of the ducts or passages, with the known viscosity of the chemicals at a known temperature being a controlling factor.

The operation is identical with that of the embodiment of Figure 8.

Figure 10:
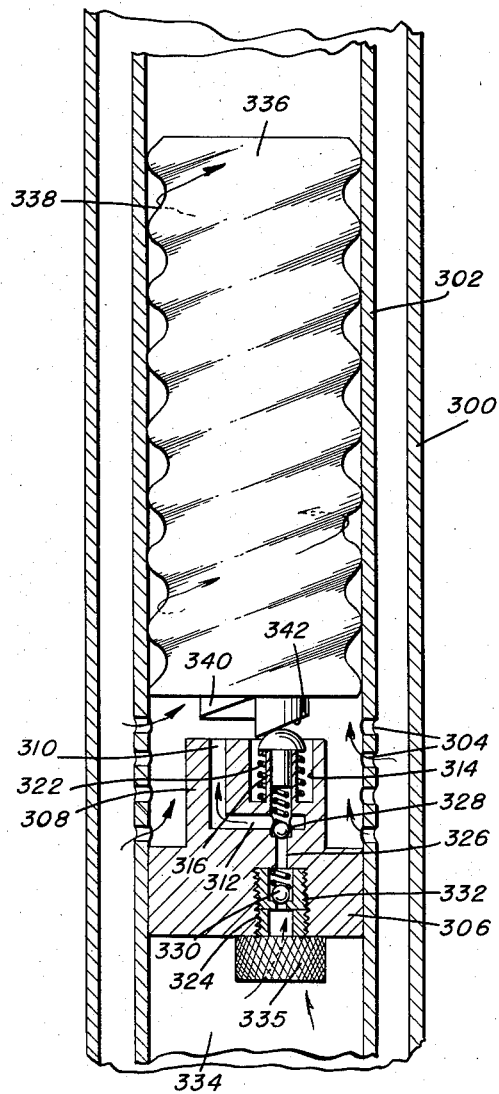
Figure 10 is a view similar to Figure 3 of still another embodiment of apparatus for carrying out the principles of the invention.
Figure 11:
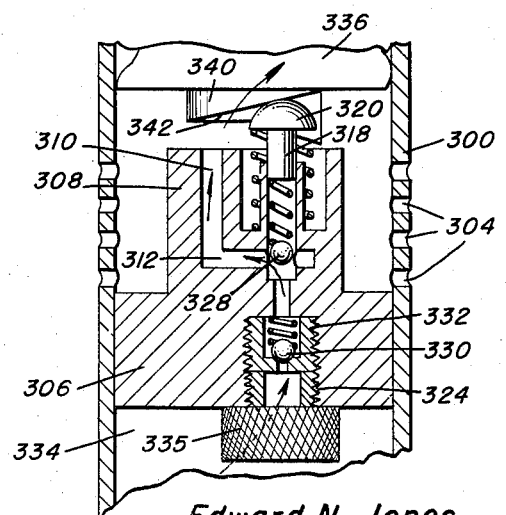
Figure 11 is an enlarged view of the lower portion of the apparatus of Figure 10.

Embodiment of Figures 10 and 11

Figure 12:
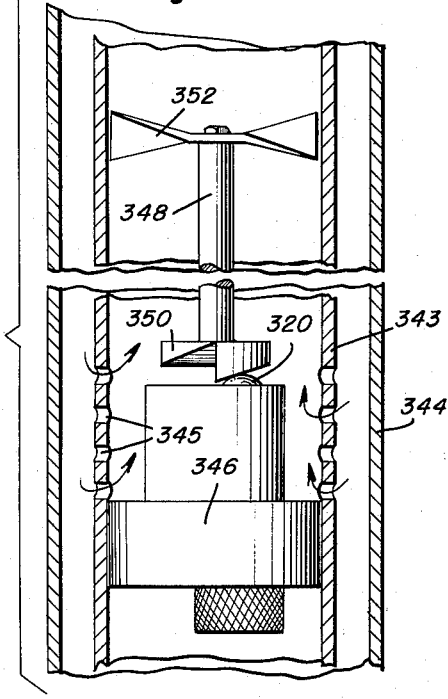
Figure 12 is a view similar to Figure 10 of the upper portion of yet another embodiment of apparatus, parts being broken away.

A further manner for utilizing the fluids flowing in a flow tubing of a well bore for ejecting chemicals into the flowing fluids, as shown in Figures 10–12, consists in using a continuously rotating element to operate a pump.

In Figure 10 there is disclosed a section of a well casing or tubing 300 in which there is disposed the barrel of the dispenser indicated at 302 and which may be anchored in place as in the preceding embodiments. A plurality of apertures 304 are formed in the side of this barrel for admitting fluid from the flowing well into the interior of the device. Suitably fixedly secured in any desired manner in the barrel below these apertures is a body 306 forming a partition and from which rises a diametrically reduced neck portion 308. An upwardly opening passage or passages 310 are formed in this neck portion for dispensing chemical upwardly therefrom and a transverse bore or bores 312 communicate therewith. Also formed in the neck portion 308 is an upwardly opening cylindrical recess 314 having a centrally disposed sleeve or cylinder 316 therein. This sleeve constitutes a downwardly opening pump barrel, communicating with the passage means 312.

Reciprocable in the pump barrel is a pump plunger 318 having an enlarged head 320 which is yieldingly urged upwardly as by compression spring 322 which surrounds the pump barrel 316. An internally threaded bore 324 opens upwardly from the lower end of the body 306, and communicates with the pump chamber by a passage 326, there being provided a spring actuated downwardly closed check valve 328 controlling the flow between this passage and the pump chamber. A further downwardly closed check valve assembly 330 is provided in the cylindrical fitting 332 disposed in the bore 324, by means of which chemical is fed from a storage chamber 334, composed of that portion of the barrel 302 lying beneath the body or partition 306, through the series of valves and into the pump chamber. A suitable filter 335 is provided at the inlet end of the passage 324.

Freely rotatable within the upper portion of the receptacle barrel 302 is a rotor 336 having its external surface provided with a helical groove 338, and having a depending axially disposed cylindrical projection 340 providing upon its lower face an annular cam surface 342 engaging the upper end of the plunger head 320.

The arrangement is such that flow of fluid in the well passing through the apertures 304 moves upwardly along the channel 338, imparting rotation to the member 336. In turn, the cam 342 of this member reciprocates the pump plunger 318, thus pumping metered charges of chemical from the receptacle 334 into the stream of fluid. Figures 10 and 11 show the position of the parts at opposite positions of the pump piston.

The rate of ejection of chemical by the device can be controlled by varying the length of the pump stroke, the resistance to flow of the filters and/or valve assemblies, the speed of rotation of the rotor 336, and the like.

Embodiment of Figure 12

A somewhat similar embodiment and modification is disclosed in Figure 12. In this form, the receptacle indicated by the numeral 343 and which is of the same construction as the receptacle 302, is disposed in a section of a tubing or casing 344 as in the preceding form. The barrel of the receptacle here is also provided with apertures 345 for the ingress of fluid flowing from the well, as shown by the arrows in that figure. Indicated generally by the numeral 346 is a dispensing device which is identical with that shown at 306 in the preceding embodiment, the parts of which are designated therein by the same numerals 308 to 334 inclusive.

However, in place of the rotor 336, a slightly different type of flow operated, continuously rotating actuating means is provided for energizing the pumping device. For this purpose, there is provided a suitably journaled axial shaft 348 having a cam member 350 at its lower end which corresponds to the cam member 340 of the preceding embodiment. At its upper end, the shaft 348 is provided with a propeller or turbine vane 352 whereby the flow of fluid as indicated by the arrows will cause rotation of the shaft 348 and thus energization of the pump.

The operation of this embodiment is identical with that described in connection with the construction of Figures 10 and 11.

*Embodiment of Figures 13 and 14*

It is also possible to control the feeding of measured charges of chemical into a well from the pressure differences created in the well, by means of a bellows or diaphragm construction. For that purpose, in these figures the tubing or well casing is indicated by the numeral 360 and the barrel of the receptacle is indicated generally at 362. The receptacle may be of any of the constructions as previously set forth herein.

The upper end of the barrel 362 is provided with an enlarged head 364 from which rises a suitable support such as a sleeve 365 through which is slidably disposed a shaft 366. A bellows 368 is at its lower end attached to the upper end of the support 365 and is operatively connected at its upper end to the shaft 366, whereby upon expansion or contraction of the bellows in response to pressure fluctuations upon its exterior, the shaft 366 will be vertically reciprocated through the headed portion 364.

The lower end of the shaft is provided with an enlarged portion 370 and a compression spring 372 encircles the shaft and abuts against the head 364 and the headed portion 370 to yieldingly urge the shaft downwardly and thus expand the bellows. The shaft is provided with a longitudinally extending recess or groove 374 constituting a metering chamber. A dispensing chamber 376 is provided in the head 364 and communicates as by means of passages 378 with the interior of the barrel 362. The support 365 has its interior constantly communicating with the atmosphere, as by ports 367.

The arrangement is such that when the valve is in the position shown in Figure 13, with the bellows in its collapsed position, the chamber 374 registers with the interior of the barrel 362, for thus receiving a metered charge of the chemical to be dispensed. When the pressure in the well decreased as when the well is opened, the bellows 368 expands, thereby lifting the rod 366 and moving the chamber 374 above the head 364, thereby lifting the rod 366 and moving the chamber 374 above the head 364, thereby exposing the metered charge to the flowing fluid to the space with the support 365 and through the ports 367 to the flowing fluid in the casing or tubing 360.

It should be noted that the various above described embodiments possess different advantages for particular situations. One type may be considerably better in a gas-lift well, another in a flowing well, another in a pumping well and still another in a gas well. Further, the various pressures and temperatures found at various depths would be a factor to be considered.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An automatic dispenser for releasing chemicals into a well comprising a receptacle insertable into a flow tubing, said receptacle having a storage chamber and an injection chamber therein, a member reciprocable in both of said chambers, means operable upon reciprocation of said member for effecting by positive displacement and pressure the transfer of chemical from the storage chamber to the injection chamber and from the injection chamber to the exterior of the receptacle, means including said receptacle and said reciprocable member responsive to variations in the rate of flow of well fluid in the well for causing reciprocation of said member and discharge of chemical from said receptacle into the flowing fluid in said well.

2. The combination of claim 1 wherein said member comprises a piston.

3. The combination of claim 1 including means for detachably securing the dispenser in a predetermined position in a flow tubing.

4. The combination of claim 1 including means attached to said member for securing the dispenser in stationary position to a predetermined portion of a flow tubing during reciprocation of the receptacle therein.

5. An automatic dispenser for releasing chemicals into a well comprising a receptacle consisting of a hollow body having upper and lower closures and a piston reciprocably slidable in said receptacle between said closures, said piston dividing the hollow interior into storage and injection chambers on opposite sides of the piston, means for mounting the dispenser upon a fixed portion of a flow tubing and including means for effecting relative reciprocation of the piston and receptacle in response to predetermined changes in the rate of flow of the well fluid through the flow tubing, means operable upon relative opposite reciprocating movements of the piston in the receptacle for alternately transferring charges of chemical from the storage chamber to the injection chamber and from the injection chamber to the exterior of the receptacle, said last means being responsive to an increase in the rate of flow of the well fluid for discharging charges of chemical from the injection chamber into the flowing well fluid.

6. The combination of claim 5 wherein said mounting means includes a rod secured to said piston and slidable through the lower closure, a releasable fastener on the exterior end of said rod.

7. The combination of claim 5 wherein said transferring means includes a valved passage through said piston communicating with both of said chambers.

8. The combination of claim 5 wherein said transferring means includes a valved passage through said piston communicating with both of said chambers, and a valved passage in the lower closure establishing communication between the injection chamber and the exterior of the receptacle.

9. The combination of claim 5 including means for venting pressure from the storage chamber through the upper closure to the exterior of the receptacle.

10. The combination of claim 5 including means associated with the lower closure and with the piston for filling the storage chamber.

11. An automatic dispenser for releasing chemicals into a well comprising a receptacle consisting of a hollow body having upper and lower closures and a piston reciprocably slidable in said receptacle between said closures, said piston dividing the hollow interior into storage and injection chambers on opposite sides of the piston, means including said receptacle and piston operable in response to a predetermined change in the rate of flow of well fluid in a well for effecting relative reciprocation of the piston in said receptacle, means operable in response to movement of the piston in one direction for removing a charge of chemical from the storage chamber and delivering it to said injection chamber, an outlet means communicating said injection chamber with the exterior of said receptacle, means operable in response to movement of the piston in the other direction for discharging said charge of chemical through said outlet means to the exterior of said receptacle, said last mentioned means being responsive to an increase in the rate of flow of the well fluid in the well for discharging said charge of chemical into the flowing fluid in the well.

References Cited in the file of this patent

UNITED STATES PATENTS

| | | |
|---|---|---|
| 1,410,827 | Muehl | Mar. 28, 1922 |
| 2,631,673 | Halderson et al. | Mar. 17, 1953 |
| 2,698,057 | Kelly | Dec. 28, 1954 |
| 2,757,742 | Tucker | Aug. 7, 1956 |